June 19, 1923.
R. C. FANCHER
1,458,928
PRESSURE REGULATOR AND CUT-OFF FOR INFLATING TUBES
Filed Aug. 15, 1921
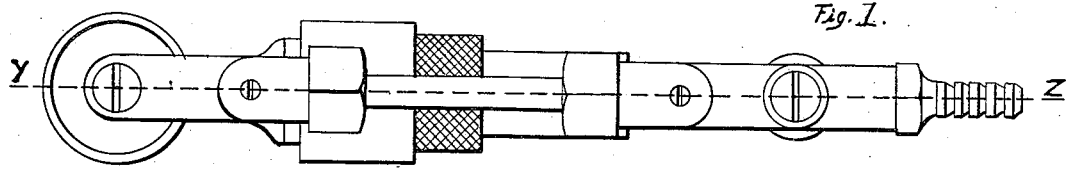
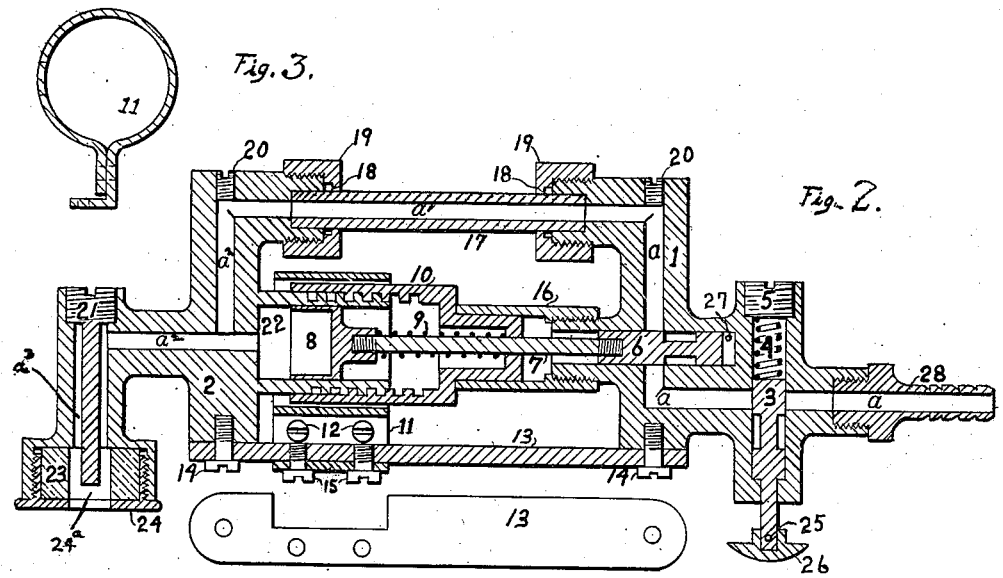
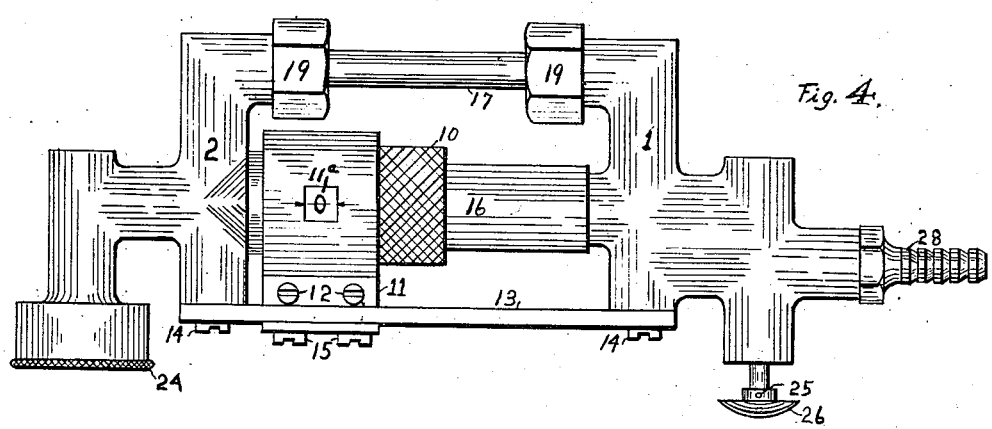
WITNESSES:
Leslie Clyde LaGrou
Arthur H Satterlee
INVENTOR.
Ray Curtis Fancher Patented June 19, 1923.

1,458,928

UNITED STATES PATENT OFFICE.

RAY C. FANCHER, OF UTICA, NEW YORK.

PRESSURE REGULATOR AND CUT-OFF FOR INFLATING TUBES.

Application filed August 15, 1921. Serial No. 492,459.

*To all whom it may concern:*

Be it known that I, RAY C. FANCHER, a citizen of the United States, residing at Utica, in the county of Oneida and the State of New York, have invented a new and useful Pressure Regulator and Cut-Off for Inflating Tubes, and of which the following is a specification.

My invention relates to a gauge for regulating the pressure in pneumatic tires and I declare the following to be a full, complete and exact description thereof sufficient to enable anyone skilled in the art to which it appertains to make and use the same, reference being had to the accompanying drawings in which like reference characters refer to like parts throughout the specification.

The object of the invention is to provide a device that will cut off automatically the pressure of air from entering an inflating tube of a pneumatic tire at any predetermined degree of pressure within said tube, whereby to not only assure the proper filling of the tube with air but also to prevent an over filling of the same, and the consequent bursting of the tube.

The object will appear by referring to the drawings in which:

Fig. 1 is a top plan view of the device;

Fig. 2 is a central vertical section taken on the line Y—Z of Fig. A;

Fig. 3 is a central vertical section of a guard employed;

Fig. 4 is a side elevation of the device;

Fig. 5 is a plan view of a plate employed.

Referring more particularly to the drawings, the device embodies a casing 1 having a channel $a$ for the passage of air or other fluid. Casing 1 has a screw threaded orifice for mounting the nozzle 28 that is corrugated or ribbed to aid in holding the air hose, not shown, that is connected thereto.

A valve 3 is adapted to close the channel $a$ normally. It is held closed by a coiled spring 4 which is disposed within a recess that is closed by screw cap 5. Valve 3 has a stem that projects through casing 1. A thumb button 26 is held to the free end of the stem by a pin 25. A pressure on button 26 will actuate valve 3 against spring 4, whereby to open the valve and allow the pressure to pass along channel $a$.

A tube 17 having a channel $a'$ is adapted to connect casing 1 with casing 2. Tube 17 is held in place by nuts 19, 19, that engage annular flanges 18, 18 formed on tube 17 and threads on casings 1 and 2.

Casing 2 has a channel $a^2$ that forms a continuation of channels $a$ and $a'$ of casing 1 and tube 17 respectively. A screw threaded cap is adapted to close channel $a^2$ at one end. Channel $a^2$ leads to a passageway $a^3$ that is partially filled by a pin 21 having an enlarged head that is screw threaded to casing 2. The lower end of pin 21 is adapted to make contact with the valve of the tire, not shown, whereby to depress said valve to allow the air to enter the tube of the tire.

A cap 24 is screw threaded to casing 2, whereby to hold rubber fabric washer 23 in place within the enlarged end of chamber $a^3$. Rubber fabric is used in making washer 23, whereby to form a cushion for making contact with the end of the valve casing, not shown.

A plate 13 that is mounted to casings 1 and 2 by screws 14, 14 is adapted to aid in holding said casings 1 and 2 in alinement. An annular guard 11 that has its ends brought together and held by screw 12 has one end bent at right angles at $12^a$. Part $12^a$ has apertures for the projection of screws 15, 15 that are adapted to mount said guard 11 to plate 13, which is recessed at $13^a$ for the projection therebeyond of part $12^a$.

The annular part of guard 11 is adapted to enclose thimble 10 having graduation marks upon its peripheral surface, which may be read through the recess $11^a$ formed in guard 11. Thimble 10 is provided with screw threads $10^a$ adapted to fit the corresponding threads of annular wall 22, whereby said thimble 10 may be moved longitudinally to adjust the tension on spring 9 that is coiled about the piston rod 7. Rod 7 is screw mounted at one end to hollow piston 8 and at the other to valve 6.

Coiled spring 9 is disposed between hollow piston 8 and end wall $10^b$ of thimble 10. Valve 6 is adapted to move in a recess $6^a$ formed by an annular projection in part $6^b$ of casing 1. A vent hole 27 is made in casing 1, whereby to allow the valve 6 to move freely. A hollow tube 16 is screw mounted at one end to the threaded exterior of part $6^b$ and is adapted to not only protect the parts therewithin from dust but also to serve as a stop to limit the longitudinal movement of thimble 10 in one direction, in which limiting position spring 9 will be under minimum strain, whereby to allow for maximum pressure of air in the tube, not shown.

The operation of the device is as follows: Nozzle 28 is connected to a source of air pressure, such as a rubber pipe. The aperture 24ª is pushed down over the valve stem, not shown, of a pneumatic tire. The gauge having been regulated by turning thimble 10 to disclose the desired degree of pressure through recess 11ª in guard 11, the operator will push then on thumb button 26, whereby to open valve 3 and allow the compressed air to pass along channel $a, a', a^2, a^3$ to fill the tube. Immediately the pressure in the tube has reached a given degree, the same pressure will react against piston 8 and force it against the tension of spring 9, which, having been previously adjusted to yield at the given pressure, will allow the valve 6 to move to closed position, whereby to automatically shut off the air pressure.

Having thus described my invention what I claim as new and desire to secure by Letters Patent is:

1. In a pressure regulator and cut off for inflating tubes, a casing having a passageway for the conduction of compressed air, a valve adapted to close said passageway, a hollow piston connected to said valve, whereby the air pressure will actuate said valve to closed position in an automatic manner when the pressure reaches a predetermined degree, a spring for controlling the movement of said piston, a thimble for adjusting the tension of said spring, and a guard for enclosing said thimble.

2. In a pressure regulator and cut off for inflating tubes, a casing having a channel for the passage of air, a valve adapted to close said passageway, a piston connected to said valve, a spring for controlling the movements of said piston, a thimble for adjusting the tension of said spring, a guard for enclosing said thimble, and a manually operated spring pressed valve for controlling the admission of compressed air to said passageway.

RAY C. FANCHER.

Witnesses:
 LESLIE CLYDE LAGROW,
 ARTHUR H. SATTERLEE.